United States Patent [19]

Foxworthy

[11] 4,064,451
[45] Dec. 20, 1977

[54] HYSTERESIS COMPENSATED REED SWITCH ASSEMBLY FOR A POSITION INDICATING SYSTEM

[75] Inventor: Milton Kearney Foxworthy, Lancaster, Ohio

[73] Assignee: Diamond Power Specialty Corporation, Lancaster, Ohio

[21] Appl. No.: 683,454

[22] Filed: May 5, 1976

[51] Int. Cl.$^2$ .................................... G01R 33/12
[52] U.S. Cl. ........................ 324/207; 176/19 R; 200/84 C; 335/153; 335/206; 340/282
[58] Field of Search ............. 324/34 R, 34 D, 34 PS; 73/313, 314, DIG. 5; 335/153, 205, 206, 207, 151; 200/84 C; 340/258 C, 282, 188 R; 176/19 R

[56] References Cited

U.S. PATENT DOCUMENTS

| | | | |
|---|---|---|---|
| 3,200,645 | 8/1965 | Levins | 335/206 |
| 3,253,099 | 5/1966 | Hess | 335/153 |
| 3,594,740 | 7/1971 | Comeun | 340/282 |
| 3,656,074 | 4/1972 | Bevilacqua et al. | 335/206 |
| 3,906,469 | 9/1975 | Kronk | 176/19 R |

OTHER PUBLICATIONS

Meier et al., Hysteresis Compensation for Magnet Operated Reed Switch; IBM Tech. Bull., vol. 12, No. 6, Nov. 1969, p. 890.

*Primary Examiner*—Robert J. Corcoran
*Attorney, Agent, or Firm*—Vytas R. Matas; Joseph M. Maguire

[57] ABSTRACT

The position of a control rod located within a nuclear reactor is sensed by a position indicating system utilizing low hysteresis reed switch assemblies. Each reed switch assembly includes a reed switch having an alternating magnetic flux field applied thereto through a coil surrounding the reed switch and energized by an alternating current power source. The amplitude of the alternating magnetic flux field is adjusted to be between a first flux level required to close the reed switch and a second flux level required to open the reed switch. The level of the alternating magnetic flux field is preset to be below the second flux level to maintain the switch in the open position until an external flux field is introduced to raise the total flux level above the first flux level to actuate the reed switch to close. The interaction of the alternating and external flux fields negates the hysteresis band of ordinary reed switches and provides a more sensitive and accurate position indicating circuit.

5 Claims, 6 Drawing Figures

HYSTERESIS COMPENSATED REED SWITCH ASSEMBLY FOR A POSITION INDICATING SYSTEM

BACKGROUND OF THE INVENTION

1. Field of the Invention

The present invention relates to position indicating systems generally and particularly to position indicating circuits for indicating the position of a nuclear reactor control rod.

2. Description of the Prior Art

Position indicating systems are generally known for indicating the position of a control rod in a nuclear reactor. Such known systems employ a permanent magnet mounted to the control rod to be movable internally of the reactor along with the control rod. A reed switch circuit is usually located externally of the control rod housing along the operating length of the control rod and hence along the operating length of the permanent magnet. As the control rod moves, different reed switches of the circuit are actuated by the magnetic flux of the permanent magnet and yield appropriate output signals whose magnitudes are indicative of the position of the control rod. These output signals are used to control the nuclear reactor.

The reed switches of such reed switch circuits have an inherent hysteresis characteristic. Namely, the reed switch requires a high magnetic flux level $\phi_1$ to close the reed switch and once closed the reed switch will remain closed until the magnetic flux level drops down to low magnetic flux level $\phi_2$ significantly lower than $\phi_1$. This magnetic flux level difference results in an uncertainty as to the actual position of the control rod since the permanent magnet must be in a first position close to the reed switch to actuate the reed switch to close and must be significantly backed away from the reed switch to open the reed switch. Thus a signal from a closed reed switch can only indicate that the control rod is somewhere between the first and second control rod positions with respect to the reed switch. This factor prevents the use of reed switches in more accurate nuclear reactor controls.

SUMMARY OF THE INVENTION

The present invention solves the forementioned problems of the prior art systems by providing a position indicating system for a control rod which provides a more accurate output signal indicative of true control rod position when reed switches are used.

To accomplish this the Applicant provides a voltage divider bridge along which a series of reed switches are connected to provide output signals when actuated. The reed switches are spaced to be actuated by a movable permanent magnet mounted to the control rod. As the control rod moves, the permanent magnet actuates individual reed switches which apply a part of the voltage divider bridge to a circuit output meter. The output meter is calibrated to read control rod position corresponding to the amount of voltage divider bridge applied to the circuit. Each reed switch has a coil wrapped around itself which conducts an alternating current and establishes an alternating magnetic flux field around the reed switch with the alternating flux field to maintain the reed switch open. The introduction of an external flux field in the vicinity of the reed switch from the permanent magnet shifts the alternating magnetic flux field causing it to exceed the reed switch close flux limit and close the reed switch. Removal of the external field causes the alternating flux field to shift below the switch open limit. The hysteresis band of the reed switch is negated by sizing the amplitude of the alternating magnetic flux field to the hysteresis bond of the reed switch making the reed switch immediately sensitive to the presence and removal of the external flux field of the permanent magnet.

In view of the foregoing it is seen that one aspect of the present invention is to provide a position indicating circuit which will establish an accurate output signal indicative of control rod position when reed switches are used in the circuit.

Another aspect of the present invention is to provide a position indicating circuit wherein the hysteresis error from reed switches is minimized.

These and other aspects of the present invention will be more fully understood from the following description of the preferred embodiments considered with the drawings.

DESCRIPTION OF THE PREFERRED EMBODIMENTS

Figure 1:
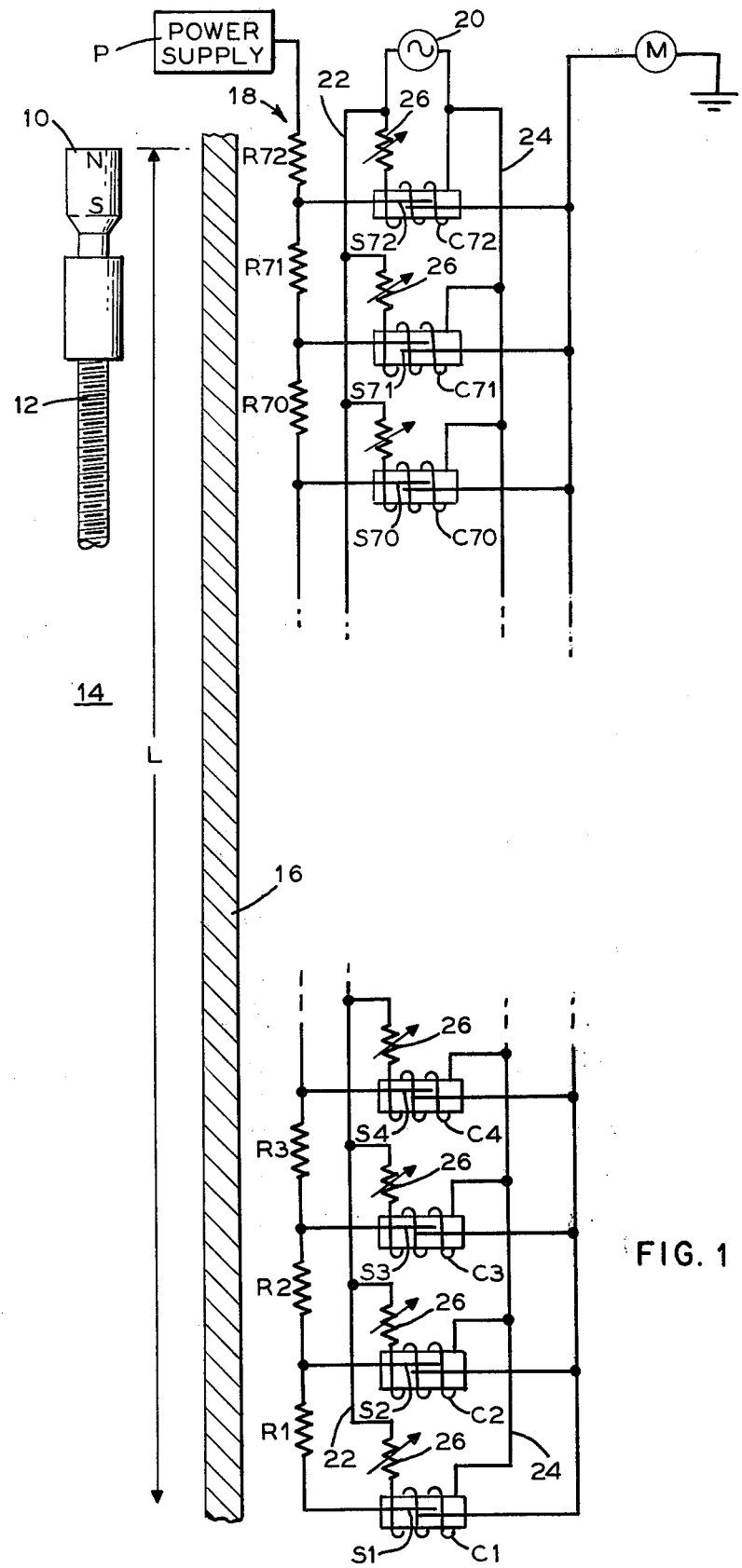
FIG. 1 is a schematic representation of the position indicating system of the present invention.
Figure 2:
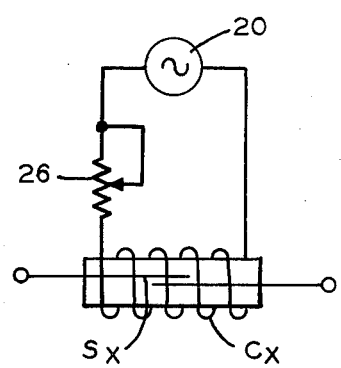
FIG. 2 is a blow up of one of the hysteresis compensated reed switches of the FIG. 1 system.

Referring now to the drawings, FIG. 1 depicts a permanent magnet 10 which is connected to a leadscrew extension 12 of a control rod (not shown) to be movable inside a sealed reactor housing 14 with the control rod. The control rod is moved by any well known drive means such as hydraulic jacks, roller nuts, pistons, etc. along a predetermined length L defining positions between full insertion of the control rod in the housing 14 and full withdrawal of the control rod from the housing 14.

The permanent magnet 10 sets up a field of localized magnetic flux which extends through a nonmagnetic wall 16 of the nuclear reactor housing 14 and actuates a reed switch in the area of the permanent magnet 10. The sealed integrity of the reactor housing 14 is thereby maintained. Mounted externally along the predetermined length L of the reactor housing 14 along a 2 inch spacing are a series of 72 magnetic reed switches $S_1$ through $S_{72}$. The reed switches $S_1$ through $S_{72}$ are in close proximity to the wall 16 and are spaced to allow actuation of the reed switches $S_1$ through $S_{72}$ as the permanent magnet 10 moves along the length L.

The reed switches $S_1$ through $S_{72}$ are connected between seventy-two resistors $R_1$–$R_{72}$ of substantially identical resistance which are series connected to form a seventy-two step voltage divider circuit 18. The voltage divider circuit 18 is connected to a 5 volt D.C. power supply P at one end and fractions of this supply voltage P may be conducted to an output meter M by closing appropriate reed switches $S_1$ through $S_{72}$. The spacing of the reed switches $S_1$ through $S_{72}$ is set up to prevent the actuation of two adjacent reed switches S by the permanent magnet 10.

Each reed switch $S_1$-$S_{72}$ has a coil $C_1$-$C_{72}$ wrapped around the reed switch which is powered by an alternating current source 20 and parallel connected across coils $C_1$-$C_{72}$ by the connection of the individual coils $C_1$-$C_{72}$ to conducting electrical lines 22 and 24. The alternating current from the current source 20 thus establishes a substantially identical alternating magnetic flux field around each reed switch $S_1$-$S_{72}$ which negates the hysteresis found in most reed switches as will be explained later. Since the hysteresis may vary slightly between reed switches each coil $C_1$-$C_{72}$ has a variable reactance element 26 series connected thereto through which the individual magnetic flux field of the coil may be adjusted to match the reeds of the reed switch.

In the foregoing circuit, a single faulty reed switch S may substantially harm the performance of the circuit due to the single actuation of the reed switches S. Other circuits are known which obviate this problem by using overlapping sequential actuation of reed switches and redundancy of reed switches. Thus it will be understood that the reed switch assembly of the present invention is applicable not only to the disclosed circuit but also to these other known circuits.

Figure 3:
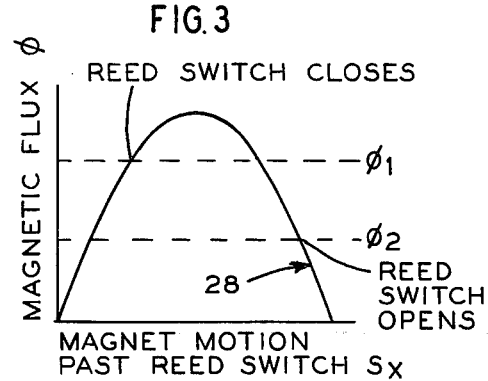
FIG. 3 is a graphic representation of reed switch conditions as the permanent magnet moves by the reed switch.

Considering FIGS. 2 through 6, in conjunction with FIG. 1, the operation of the position indicating system utilizing the hysteresis compensated reed switches $S_1$ through $S_{72}$ will be explained. Taking any of the reed switches $S_x$ it may be seen that without energizing the coil $C_x$ from the alternating current source 20 the closing and opening of the switch would follow the graph as indicated in FIG. 3. As indicated by the curve 28, when the magnet 10 approaches the reed switch $S_x$, magnetic flux in the area of the reed switch $S_x$ must build up to a first magnetic flux level $\phi_1$ before the reed switch will close to provide a signal to the meter M indicative of control rod position. However once closed the reed switch $S_x$ remains closed even though the magnetic flux level is less than $\phi_1$ until the magnet 10 has moved away from the reed switch $S_x$ sufficiently to drop the magnetic flux in the area of the reed switch $S_x$ down to a second magnetic flux level $\phi_2$ significantly lower than the first level $\phi_1$. From the FIG. 3 graph it may be seen that without energizing the coil $C_x$ the reed switch $S_x$ when actuated provides only a general indication that the control rod 12 is somewhere in the vicinity of the reed switch $S_x$ which enables it to provide a magnetic flux field to the switch $S_x$ greater than $\phi_1$.

Figure 4:
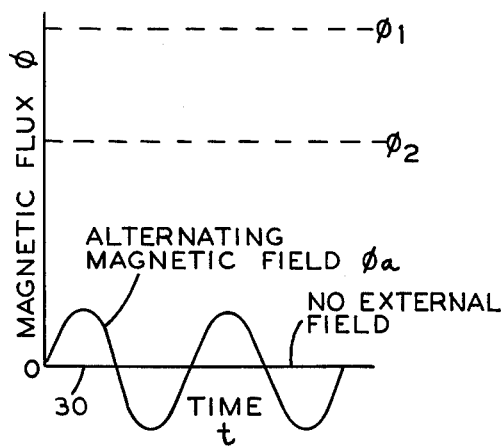
FIG. 4 is a graphic representation of the alternating magnetic flux field surrounding each of the reed switches of the FIG. 1 system.
Figure 5:
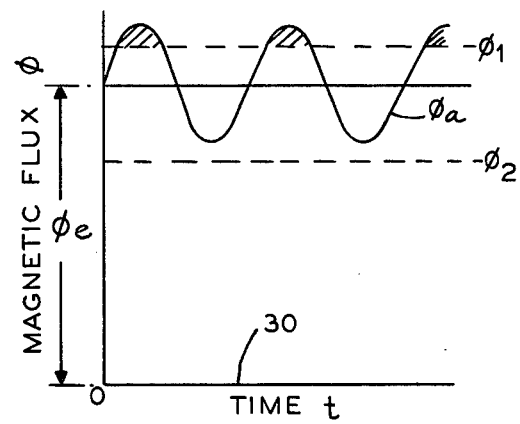
FIG. 5 is a graphic representation of the shift of the alternating magnetic flux field of FIG. 4 caused by the external flux field of the permanent magnet moving toward the reed switch.
Figure 6:
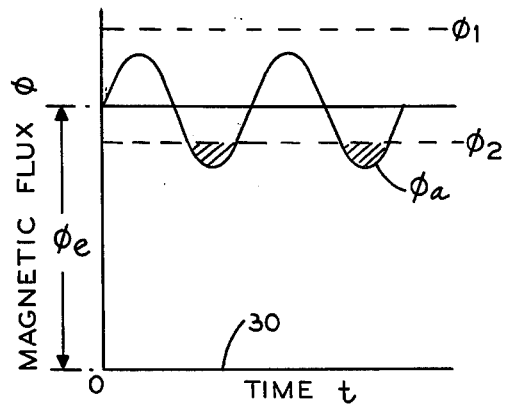
FIG. 6 is a graphic representation of the shift of the alternating magnetic flux field of FIG. 4 caused by the external flux field of the magnet moving away from the reed switch.

Turning to FIG. 4, it may be seen that when the coil $C_x$ is energized by the alternating current source 20 and adjusted through the variable reactance 26 an alternating magnetic flux $\phi_a$ is produced around the reed switch $S_x$ having an amplitude or maximum and minimum magnetic flux values which fit within the $\phi_1$ and $\phi_2$ envelope. Maintaining the alternating magnetic flux $\phi_a$ below the $\phi_1$ and $\phi_2$ envelope prevents the alternating flux $\phi_a$ from alternately actuating the reed switch to the closed and open conditions. As shown in FIG. 5, the introduction of any external magnetic flux $\phi_e$ such as from the magnet 10 will cause the external flux $\phi_e$ to combine with the alternating magnetic flux $\phi_a$ to shift the alternating flux $\phi_a$ away from the base line 30 by an amount corresponding to the external flux $\phi_e$ applied. Thus as the magnet 10 approaches the reed switch $S_x$ the alternating flux $\phi_a$ is shifted by an amount $\phi_e$ eventually causing the maximum of the alternating flux $\phi_a$ to intermittently exceed the $\phi_1$ reed switch closing flux level. The frequency of the alternating flux $\phi_a$ sinusoidal pattern is preset to be less than the natural mechanical vibration frequency of the reeds of the reed switch $S_x$ to allow the reed switch $S_x$ to stay closed once the peaks of the alternating flux $\phi_a$ sinusoidal pattern start exceeding the flux $\phi_1$. In a similar manner when the magnet 10 starts moving away from the reed switch $S_x$ the external flux $\phi_e$ diminishes, the combined alternating flux $\phi_a$ and the reduced external flux $\phi_e$ below the $\phi_2$ level, as may be seen in FIG. 6, and the switch $S_x$ returns to its open condition. Returning the magnet 10 across the switch $S_x$ in the opposite dirrection would again cause the interaction of external magnetic flux $\phi_e$ with the alternating magnetic flux $\phi_a$ causing the maxima of the alternating flux sinusoidal pattern to exceed the flux level $\phi_1$ to close the switch.

From the foregoing it will be seen that by proper adjustment of the amplitude of the alternating flux $\phi_a$ sinusoidal to fit within the hysteresis envelope of the reed switch $S_x$ formed by $\phi_1$ and $\phi_2$ the hysteresis prevalent in reed switches may be minimized if not nearly eliminated.

Certain modifications and improvements will occur to those skilled in the art upon reading this specification. It will be understood that all such modifications and improvements have been deleted herein for the sake of conciseness and readability but are properly within the scope of the following claims.

What I claim is:

1. A position indicating system for determining the position of a movable member inside a sealed container comprising:

a magnetic flux producing member mounted to the movable member to be movable therewith;

a series of reed switches spacedly mounted externally of the sealed container along the length of the sealed container to be individually actuated by the flux producing member as the movable member moves within the sealed container to indicate the position of the movable member thereby; and means affixed to each of said series of reed switches for producing a continuous alternating magnetic flux field in the area of each of said reed switches to minimize hysteresis between the actuated and unactuated reed switch position including a coil wrapped around each reed switch to conduct alternating electric current therethrough and a source of alternating electric current continuously connected to each of said coils independently of the position of said movable member.

2. A position indicating system as set forth in claim 1 including a variable resistor individually connected to each of said coils for individually adjusting the alternating magnetic flux applied to each reed switch.

3. A low hysteresis reed switch assembly for position indicating systems having a magnetic member producing an external magnetic flux and movable in a sealed container comprising:

a reed switch mounted externally of the sealed container to be normally actuated by a first magnetic flux level and deactuated at a second lower magnetic flux level;

a source of alternating electrical current; and a wire coil wrapped around said reed switch to produce an alternating magnetic flux having an amplitude fitting between said first and said second flux levels and being permanently connected to said source of alternating current to allow said reed switch to be actuated and deactuated by the introduction and withdrawal of any magnetic flux from said magnetic member in the vicinity of said reed switch.

4. A low hysteresis reed switch assembly as set forth in claim 3 including a variable resistor connected between said wire coil and said source for adjusting the alternating magnetic flux applied to the reed switch.

5. A method of minimizing hysteresis between reed switch actuation and deactuation in position indicating systems comprising the steps of:

providing a reed switch in the position indicating system having predetermined operating conditions responding to a first constant magnetic flux level and a second constant magnetic flux level having a lower level than the first constant magnetic flux level;

providing a constant alternating magnetic flux around the reed switch having maximum and minimum magnetic flux levels within the range of the first and second constant magnetic flux levels; and moving an external constant magnetic flux field into the area of the reed switch to interact with the alternating magnetic flux field and change the predetermined operating conditions of the reed switch.

* * * * *